E. F. SMITH.
Corn Planter.

No. 61,273.

Patented Jan. 15, 1867.

Witnesses:
F. A. Jackson
Theo Tusch

Inventor
E. J. Smith
per Munn & Co.
Attorneys

United States Patent Office.

ELLIS F. SMITH, OF ORANGEVILLE, ILLINOIS.

*Letters Patent No. 61,273, dated January 15, 1867.*

---

IMPROVEMENT IN CORN PLANTER.

---

*The Schedule referred to in these Letters Patent and making part of the same.*

---

TO ALL WHOM IT MAY CONCERN:

Be it known that I, ELLIS F. SMITH, of Orangeville, in the county of Stephenson, and State of Illinois, have invented a new and improved Corn Planter; and I do hereby declare that the following is a full, clear, and exact description thereof, reference being had to the accompanying drawings, forming part of this specification.

The nature of my invention consists in so constructing a corn planter that corn, cane, and other seeds can be planted in check rows. My improved planter is so arranged that the seeds may be planted to any desired depth and in any given quantity.

To enable others skilled in the art to make and use my invention, I will proceed to describe its construction and operation.

Letters of like name and kind refer to like parts in each of the figures.

Figure 1:
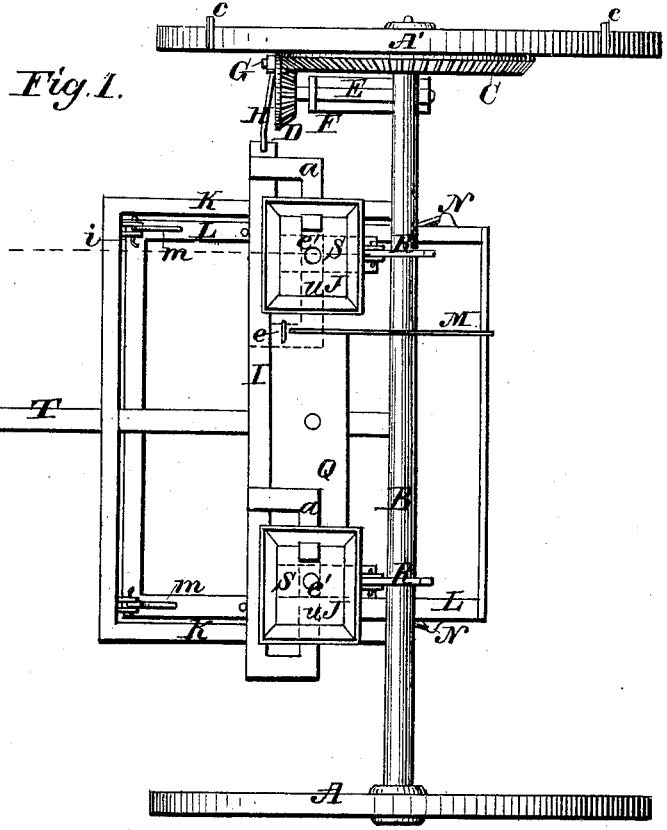
Figure 1 is a top plan view of my improved corn planter.
Figure 2:
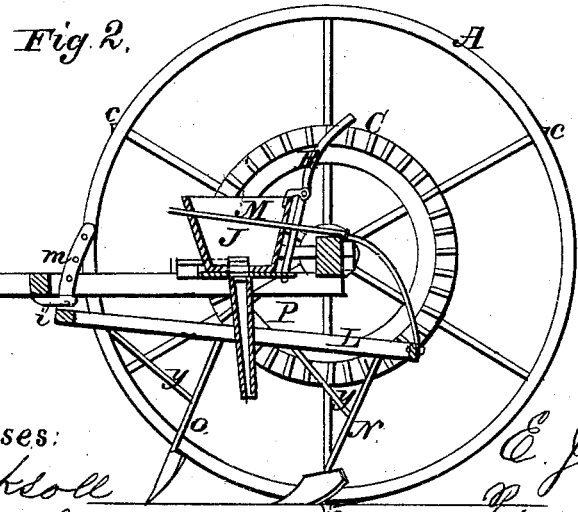
Figure 2 is a longitudinal vertical sectional elevation of the same.

A A' represent two wheels, of common construction, which run on an axle, B, also of common construction. Upon the wheel A' is secured a bevel gear-wheel, C, that meshes into and drives a corresponding pinion-wheel, D, that is rigidly secured to a shaft, E, one end of which runs in a bearing, F, that is secured to and projects out in front of the axle B; the other end of the said shaft has a bearing, and runs in the axle B. On this said pinion-wheel D is a crank-pin, G, to which connects a pitman, H. The said pitman H also connects with the slide or slide-bar I that is located in front of the hoppers upon the frame K. To the slide-bar I are attached two elbow-bars or slides $a\ a$, which pass into the bottom of the seed-hoppers J J, and have a regular reciprocating motion, produced by the pinion D, through the medium of the pitman H operating on the slide I. $u\ u$ are also slides, attached to the slide-bar I, the form of which is like the slides $a\ a$, but are attached to the bar I in a reversed position from the slides $a\ a$, so that, as the slides $u\ u$ and $a\ a$ are moved back and forth, they open and close the apertures $e'\ e'$, which are located in the bottom of the hoppers J, for the purpose of discharging the seed to the ground as said slides move alternately back and forth, which regulate the amount of seed to be planted in each hill. K is a rectangular frame, the side pieces of which are secured to the axle B. Q is a wide bar that runs parallel with the axle B, and secured to the rectangular frame K. Upon the ends of the bar Q are secured the seed-hoppers J J, which are of common construction. L is an auxiliary rectangular frame, connected at its forward end with the frame K by means of adjusting ears $m\ m$, which extend up from the frame I, and perforated, for the purpose of receiving a bolt that passes through the perforation and clips or straps $i\ i$, which are attached to the frame K, and receive the said ears $m\ m$, thus forming a joint, so that the rear end of the frame I may be elevated or lowered, as may be desired, by means of the lever M, which connects with the rear end of the frame L, and extends up and forward over the axle B. When it is desired to elevate the frame L, the lever M is brought down and engaged under the hook $e$. The ears $m\ m$ are for the purpose of elevating and lowering the front end of the frame L. To the frame L are secured ploughs N N, and furrowers, O O, supported by inclined braces, Y Y. The furrowers O O are located and secured to the frame L in such a position that they come in front of the tubes P P, which conduct the seed into the furrow made by the furrowers O O. These tubes P P are secured to the under side of the bar Q that extends from one end of the frame K to the other, and upon which are located the hoppers J J, all resting and supported by the frame K. R R are levers pivoted to the top of the hoppers J J, which extend downward and connect with the slides S S, shown in dotted lines, fig. 1. These slides pass from the end of the levers R R into the bottom of the hoppers J J, and are for the purpose of cutting off the flow of seed while the machine is turning round or going from place to place. Upon the traction-wheel A' are three markers, $c\ c\ c$, that make a print over the hill, so that it shows upon the previous row planted. It will be observed that the hoppers are located so that the distance between them is just double the distance from one wheel to the hopper next adjoining the wheel, so that a plain mark is made on the ground by the markers $c\ c\ c$ as a guide for the next rows. T is the pole, secured to the frame K, and extends back, and is also secured to the axle B. It will be understood that the gearing is so constructed and arranged that three hills will be planted at each revolution of the traction-wheel A', and the seed dropped just at the time when the marker is on the ground. The seed flows from the hopper when the slides *a a* are open, into the recesses or cells (at each end of the bar) Q upon the slides *u u*. Now, as the slides *a a* are open the slides *u u* are closed, and the cells are filled with seed; and as the slides *u u* open the slides *a a* are closed, and cut off the flow of seed, while that in the cell is allowed to flow out into the furrow; and so on at each alternate motion of the slide.

Having thus described my invention, what I claim as new, and desire to secure by Letters Patent, is—

The traction-wheel A', provided with markers *c c c*, in combination with the gear-wheels C and D, so constructed that a hill will be planted when the marker is on the ground, for the purposes and substantially as described.

ELLIS F. SMITH.

Witnesses:
W. A. ST. JOHN,
D. R. RUBENDALL.